United States Patent
Cornic et al.

(10) Patent No.: US 7,994,964 B2
(45) Date of Patent: Aug. 9, 2011

(54) METHOD FOR DETERMINING THE POSITION, NOTABLY IN TERMS OF ELEVATION, OF A TARGET FLYING AT VERY LOW ALTITUDE

(75) Inventors: Pascal Cornic, Brest (FR); Eric Barraux, Brest (FR); Patrick Garrec, Merignac (FR)

(73) Assignee: Thales (FR)

( * ) Notice: Subject to any disclaimer, the term of this patent is extended or adjusted under 35 U.S.C. 154(b) by 65 days.

(21) Appl. No.: 12/301,215

(22) PCT Filed: May 9, 2007

(86) PCT No.: PCT/EP2007/054491
§ 371 (c)(1),
(2), (4) Date: Mar. 16, 2009

(87) PCT Pub. No.: WO2007/131923
PCT Pub. Date: Nov. 22, 2007

(65) Prior Publication Data
US 2009/0315755 A1 Dec. 24, 2009

(30) Foreign Application Priority Data

May 16, 2006 (FR) .................. 06 04373

(51) Int. Cl.
*G01S 13/91* (2006.01)
(52) U.S. Cl. ........... 342/38; 342/123; 342/148; 342/156
(58) Field of Classification Search ............ 342/38, 342/148
See application file for complete search history.

(56) References Cited

U.S. PATENT DOCUMENTS

| | | | | |
|---|---|---|---|---|
| 2,717,380 A | * | 9/1955 | Brooks, Jr. | 342/422 |
| 3,159,837 A | * | 12/1964 | Van Alstyne et al. | 342/33 |
| 3,229,283 A | * | 1/1966 | Hefter et al. | 342/421 |
| 3,742,505 A | | 6/1973 | Rocke | |
| 3,757,326 A | * | 9/1973 | White | 342/81 |
| 3,781,886 A | * | 12/1973 | Lank et al. | 342/78 |

(Continued)

FOREIGN PATENT DOCUMENTS

FR 2251829 A1 6/1975

(Continued)

OTHER PUBLICATIONS

Inaba, T. and Araki, K. (2004), A study on high-resolution target height estimation in multipath environment—subarray configuration. Electronics and Communications in Japan (Part I: Communications), 87: 39-48. doi: 10.1002/ecja.10208.*

(Continued)

*Primary Examiner* — Thomas H Tarcza
*Assistant Examiner* — Matthew M Barker
(74) *Attorney, Agent, or Firm* — Stroock & Stroock & Lavan LLP

(57) ABSTRACT

The present invention relates to a method for determining the position notably the elevation of a target flying at very low altitude. An electromagnetic detection system extracts the measurement of the elevation on the basis of the amplitude of the interference signal produced by a signal emitted directly by the target and by a signal emitted by the target towards the ground then reflected by the ground towards the radar. Embodiments of the invention can notably be used within the framework of the guidance of drones in the final landing phase.

14 Claims, 8 Drawing Sheets

U.S. PATENT DOCUMENTS

| | | | | |
|---|---|---|---|---|
| 3,854,135 | A * | 12/1974 | White | 342/148 |
| 4,005,421 | A * | 1/1977 | Dax | 342/148 |
| 4,012,740 | A * | 3/1977 | Lenneper | 342/428 |
| 4,017,859 | A * | 4/1977 | Medwin | 342/383 |
| 4,060,807 | A * | 11/1977 | Barton | 342/148 |
| 4,084,160 | A * | 4/1978 | Leuenberger et al. | 342/148 |
| 4,090,197 | A * | 5/1978 | Cantrell | 342/148 |
| 4,110,752 | A * | 8/1978 | Neri | 342/77 |
| 4,193,075 | A * | 3/1980 | Blazek et al. | 342/408 |
| 4,316,191 | A * | 2/1982 | Sawatari et al. | 342/91 |
| 4,449,127 | A * | 5/1984 | Sanchez | 342/80 |
| 4,472,718 | A * | 9/1984 | Ohashi et al. | 342/148 |
| 4,595,925 | A * | 6/1986 | Hansen | 342/123 |
| 4,796,031 | A * | 1/1989 | Koki | 342/148 |
| 4,837,574 | A * | 6/1989 | Hill | 342/27 |
| 5,241,317 | A * | 8/1993 | Howard | 342/149 |
| 5,270,718 | A * | 12/1993 | DiDomizio | 342/147 |
| 5,278,564 | A * | 1/1994 | Groenenboom | 342/123 |
| 5,331,326 | A * | 7/1994 | Schenkel | 342/148 |
| 5,334,984 | A * | 8/1994 | Akaba | 342/149 |
| 5,341,145 | A * | 8/1994 | Eckersten et al. | 342/148 |
| 5,694,131 | A * | 12/1997 | Baggett et al. | 342/148 |
| 5,812,091 | A | 9/1998 | Robinson et al. | |
| 6,525,685 | B1 * | 2/2003 | Rose | 342/148 |
| 6,772,100 | B2 * | 8/2004 | Lipp | 702/193 |
| 7,136,012 | B2 * | 11/2006 | Wasiewicz | 342/33 |
| 7,265,710 | B2 * | 9/2007 | DeAgro | 342/120 |
| 7,358,891 | B2 * | 4/2008 | Struckman et al. | 342/156 |
| 7,417,584 | B1 * | 8/2008 | Reifler et al. | 342/148 |

FOREIGN PATENT DOCUMENTS

FR  2252578 A1  6/1975

OTHER PUBLICATIONS

Litva, et al. "A new Technique for low-angle radar tracking" Communication, Computers and Signal Processign, 1991, pp. 124-127.

Gao, et al: "Radar low-angle trancking with subarray level ML tracking algorithms" Digital Signal Processing 2, 1992, vol. 5, conf 17, pp. 453-456.

* cited by examiner

METHOD FOR DETERMINING THE POSITION, NOTABLY IN TERMS OF ELEVATION, OF A TARGET FLYING AT VERY LOW ALTITUDE

This application under 35 U.S.C. §371 is the U.S. national stage application of, and claims priority from, International Application No. PCT/EP2007/054491, filed May 9, 2007, which in turn claims priority from French patent application No. 0604373 filed with the French Patent Office on May 16, 2006, both of which are incorporated herein by reference in their entirety.

BACKGROUND OF THE INVENTION

The present invention relates to a method for determining the position notably the elevation of a target flying at very low altitude. This invention can notably be used within the framework of the guidance of drones in the final landing phase.

BRIEF DESCRIPTION OF THE PRIOR ART

The guidance of a drone in the landing phase makes it necessary to locate it in an accurate manner so as to calculate its trajectory up to the touchdown point on the runway and to correct its trajectory throughout the landing phase. To this end a system composed of a radar, at least one ground beacon and at least one beacon on board the drone can be implemented. The objective of this system is to improve location accuracy. However, elevational location of the drone is subject to inaccuracies, related to the presence of multiple reflections of the signal emitted by the target on the ground. The interferences related to the reflection of the signal on the ground are particularly significant on account of the small value of the angle of incidence of the drone during the landing phase.

Location results are generally improved by filtering the signals reflected by the ground as well as by minimizing the contribution of these signals by optimizing the orientation and directivity of the radar antenna beam.

For this purpose, a first solution consists in reducing the width of the antenna beam and in pointing the latter towards the target, so as to minimize the contribution of the signal reflected by the ground by placing the pathways reflected by the ground in throughs of the antenna pattern. This solution is conceivable only if the constraints weighing on the dimension of the antenna and its physical installation are not too significant. Indeed it requires bulky and expensive hardware. In fact this solution is rarely used in a context where for example a mobile radar must be available.

Other solutions are known for improved locating of a target flying at very low altitude in the event of multiple reflections. Among the latter, the following solutions can be used alone or in a mutually complementary manner.

For example, a second solution consists in using high-resolution adaptive processing operations on the signal received. These processing operations exhibit the twofold drawback of being difficult to implement and of giving poor results if the assumptions made about the model vary, even very slightly. Furthermore, they demand significant calculation capability, thereby increasing the cost of the system.

A third solution resides in the increase in the distance and Doppler resolution. However, this increase in resolution can only be effected if the radar is positioned at a sufficiently high level relative to the ground. This is not always possible having regard to the context of use which greatly constrains the height of radar antennas, again for example, for a mobile radar.

A fourth solution is aimed at increasing the diversity of the emission frequencies. Nevertheless, diversifying the frequencies makes it necessary to employ a significant frequency span in order for this to be effective. This is often incompatible with the application involved and, additionally, is not always authorized by the agencies that allocate the frequencies.

SUMMARY OF THE INVENTION

An aim of the invention is notably to alleviate the aforesaid drawbacks. For this purpose, the subject of the invention is a method for determining the elevation of a target close to the ground by an electromagnetic detection system. This method extracts the measurement of the elevation on the basis of the amplitude of the interference signal produced by a signal emitted directly by the target and by a signal emitted by the target towards the ground then reflected by the ground towards the radar. The system emits a detection signal towards the target. The interference signal is produced by the signal re-emitted directly by the target and the signal re-emitted by the target towards the ground then reflected by the ground towards the detection system. The reception antenna is composed for example of arrays of radiating elements. The interference signal received by this antenna can be sampled at the level of the sub-arrays. The measurement of the elevation is then established on the basis of the amplitude of the sampled interference signal. The sub-arrays each correspond for example to a line of radiating elements and can be disposed in a horizontal, parallel and uniform manner over the antenna as a whole. The sub-arrays can also be situated in a substantially vertical plane. The frequency f of the sampled signal is for example the value which minimizes the following function:

$$J(U) = \sum_{i,k} |r_{i+k} + r_{i-k} - 2r_i \cos(2\pi U k \Delta)|$$

with
$r_{i+k}$ representing the result of the subtraction between the value of the signal received at the level of the sub-array of order i+k and the value of the signal received at the level of the sub-array of order i+k+1, $r_{i-k}$ representing the result of the subtraction between the value of the signal received at the level of the sub-array of order i-k and the value of the signal received at the level of the sub-array i-k-1,
$\Delta$ representing the distance between the phase centres of two consecutive sub-arrays.

The ratio between the height $h_2$ of the target relative to the ground and the distance d projected on the ground between the radar and the target is expressed as a function of the frequency f of the interference signal calculated according to the following relation: $h_2/d = \lambda f/2$ where $\lambda$ is the wavelength of the signal emitted.

Advantageously the elevation height $h_2$ can be determined for non-plane and non-horizontal ground on the basis:
of the point of reflection R of the signal re-emitted by the target towards the ground on the latter,
of the elevation height determined for plane and horizontal ground.

The expression of the equality between the angles of incidence of the ray re-emitted by the target towards the ground and that reflected by the ground with the tangent plane to the ground at the reflection point makes it possible to obtain the coordinates ($x_R$, $z_R$) of the reflection point R as well as the angle $\alpha_R$ between the tangent plane to the ground at the point R and the horizontal on the basis of the following cost function:

$$|C(r)| = \left| \frac{h_1 - z_R + x_R \times \alpha_R}{x_R} - \frac{h_2}{d - x_R} \right|$$

where $h_1$ represents the height relative to the ground of the antenna, $h_2$ represents the estimation of the elevation height calculated in the case of plane and horizontal ground, the values ($x_R$, $z_R$, $\alpha_R$) minimizing this function are the coordinates of the reflection point R.

Obtaining the value of the angle $\alpha_R$ between the tangent plane at R to the terrain and the horizontal allows notably to correct the height of the target relative to the tangent plane to a value $H_2$ in the following manner: $H_2 = h_2 + z_R + (d - x_R) \times \alpha_R$, $h_2$ being the calculated height of the target relative to the ground in the case of plane and horizontal ground and d being the projected distance on the ground of the target from the antenna.

The processing according to the invention can thereafter be improved by a CHA processing.

The antenna used can also be a sparse antenna.

The target can comprise an active emitter or else behave as a passive reflector. The target can be a drone in the landing phase.

The comparison of the amplitude of the reflection coefficient with a fixed threshold is for example performed previously. The height $h_2$ of the target can then be determined by a processing of monopulse type if the value of the amplitude of the reflection coefficient is less than this threshold.

The invention has notably the main advantages that it accommodates existing radar models, that it can be implemented on various types of antennas, that it uses processing that is simple to implement and that it requires insignificant calculation means.

BRIEF DESCRIPTION OF THE DRAWINGS

Other characteristics and advantages of the invention will become apparent with the aid of the description which follows, offered in conjunction with the appended drawings which represent.

DETAILED DESCRIPTION

Figure 1:
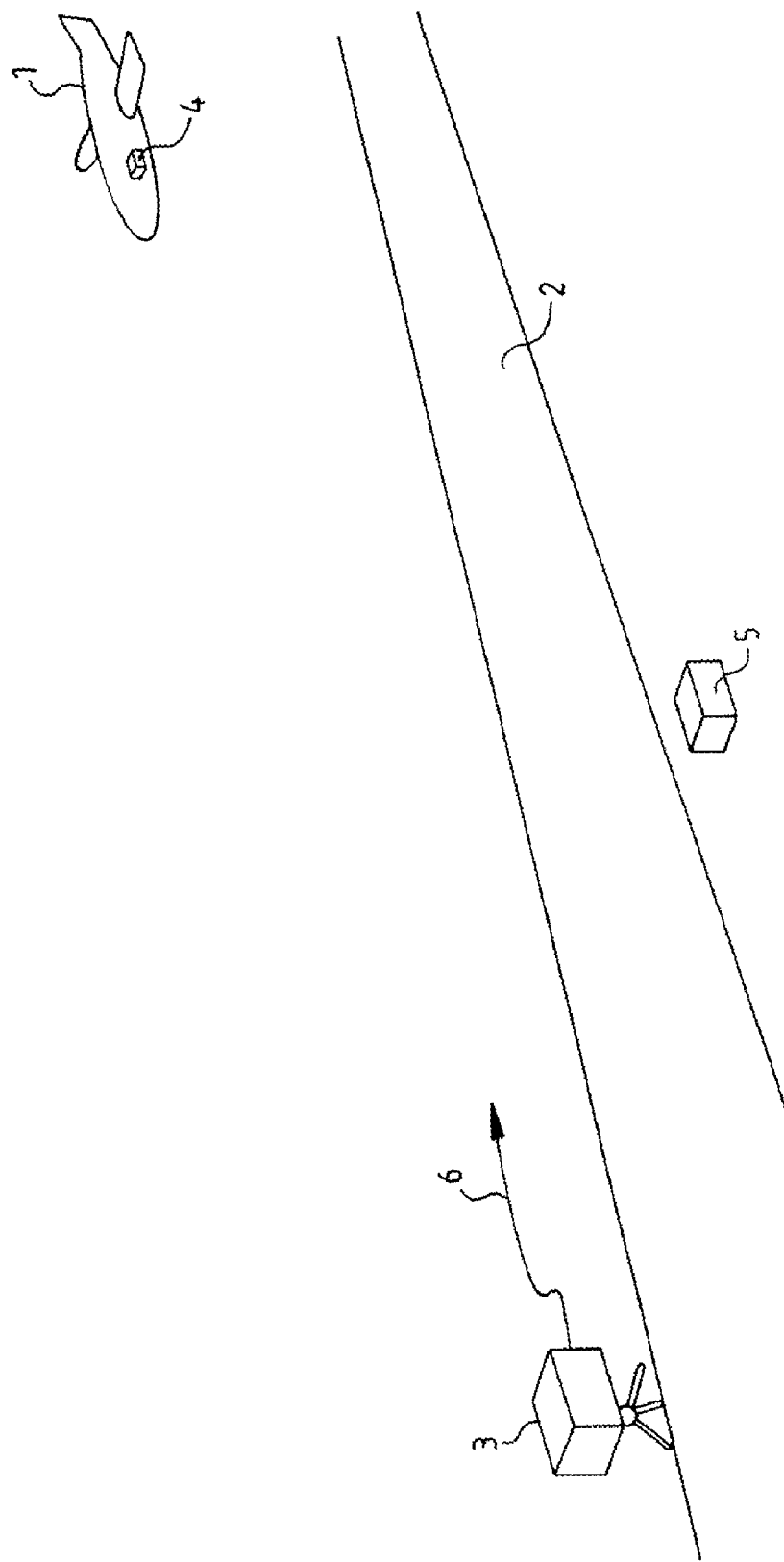
FIG. 1, an aircraft in the landing phase where the elements of a device used by the method of the invention are depicted, FIG. 2, the phenomenon of reflection of the image of the target subsequent to the emission of a radar wave, FIG. 3, the antenna pattern constituted by the target and its image, FIG. 4a, the interference signal received at antenna level, FIG. 4b, the minimum and maximum amplitudes of the interference signal received at antenna level, FIG. 5, the various processing phases of the method, FIG. 6, an exemplary sampling of the signal received by amplitude over ½ a period, FIG. 7, an exemplary sampling of the signal received by amplitude over $1/7^{th}$ of a period, FIG. 8a, the reflection phenomenon due to the image of the target in the case of a horizontal ground, FIG. 8b, the reflection phenomenon due to the image of the target in the case where the ground is not horizontal, FIG. 9, the reflection phenomenon in the case where the ground is neither plane nor horizontal.

FIG. 1 presents an aircraft 1 in the phase of landing on a runway 2. This aircraft, for example a drone, is guided by a system composed of a radar 3, a beacon 4 on board the drone, and a beacon 5 on the ground. This guidance system is notably described in French patent application No. 04 12313. To participate in the guidance of the aircraft 1, the radar must know the position of the latter, that is to say its azimuthal and elevational coordinates. For this purpose, the radar emits a signal 6 towards the aircraft 1, that will be called the target subsequently. The target can behave either as a passive reflector or as an emitter by virtue of the onboard beacon 4. The description of the present invention considers the case of the use of an emitter on board the target, but the invention can apply equally well in the case of a passive emitter.

It has been indicated previously that signals re-emitted by the target could additionally be reflected on the ground before being picked up by the radar. The state of the runway 2 may be such that the reflection is quasi-specular, these reflections producing outlying measurements.

Figure 2:
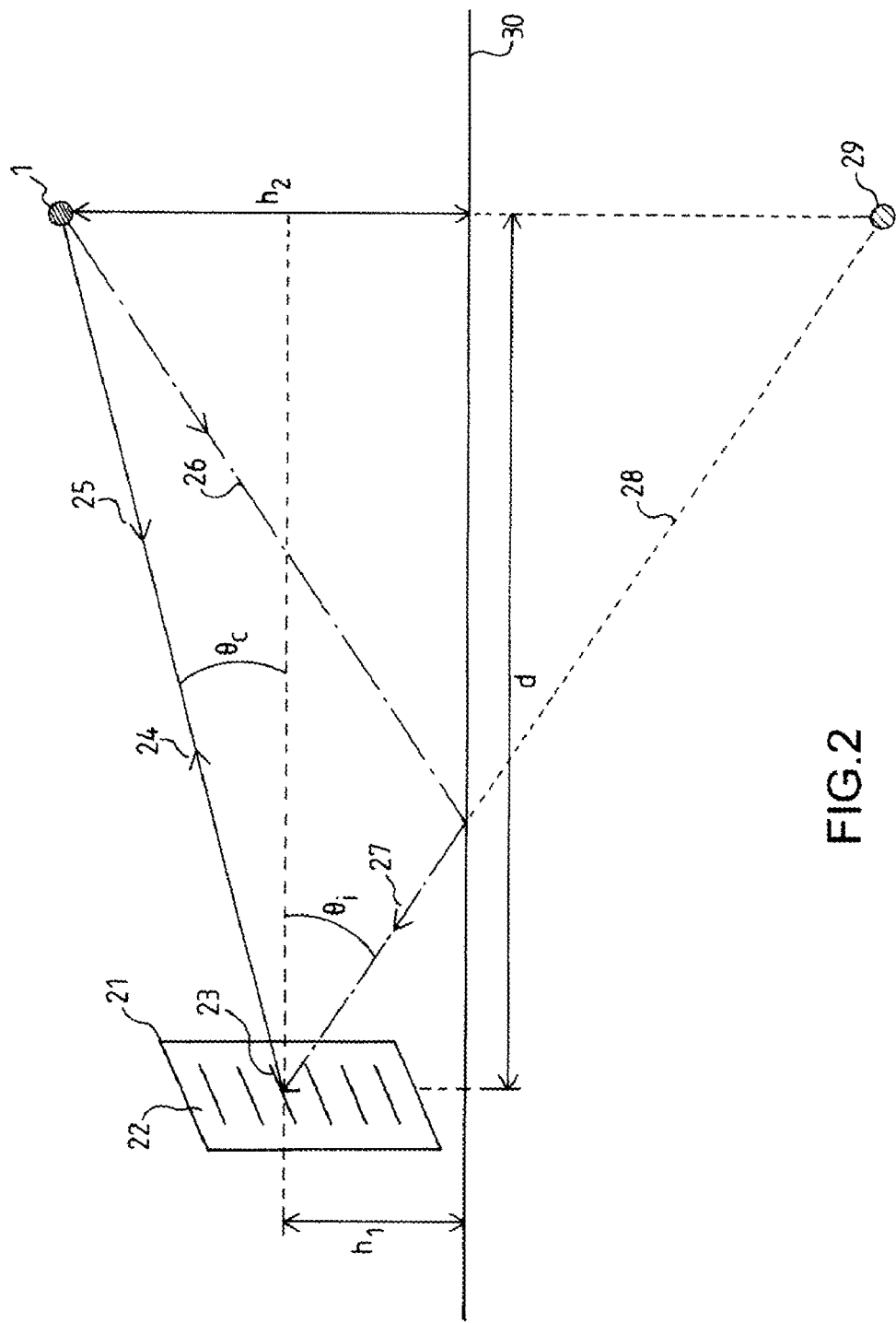

FIG. 2 illustrates the paths of the signals re-emitted by the target 1 in a direct and indirect manner. In this figure, only the antenna 21 of the radar 3 is represented. This antenna can be used in emission/reception or in reception only. In this example, the antenna 21 is an array antenna termed complete that is to say it consists of N sub-arrays 22 spaced out regularly in the vertical plane and complying with the necessary interdistance conditions so as not to create ambiguous lobes. The present invention can additionally apply also in the case of a sparse antenna. Each of the sub-arrays of the antenna 21 corresponds for example to a line of several radiating elements, whose resultant corresponds to a phase centre in the elevation plane.

In FIG. 2, the sub-arrays are represented by lines consisting of radiating elements which receive a signal of like phase in relation to the elevation plane. These lines may be horizontal as is the case in FIG. 2 or else non-horizontal. Subsequently, the lines are considered to be horizontal.

In order to simplify the diagram, only the radiations emitted and/or received by a sub-array 23 are represented. The corresponding line 23 is situated at a height $h_1$ relative to the ground. This line emits and/or receives a signal 24 towards the target 1. The target, for its part, is situated at a height $h_2$ from the ground and at a distance projected on the ground d from the radar. The resultant signal, re-emitted by the target, is composed inter alia of the following signals picked up by the line 23:

on the one hand a direct signal 25 which heads off towards the line 23 and forms with the horizontal an angle $\theta_c$ also named the angle of elevation of the target seen from the radar, on the other hand a signal 26 itself reflected by the ground 30.

The latter signal 26 is reflected in a quasi-specular manner by the ground. It reflects as a signal 27 towards the line 23. The angle $\theta_i$ formed between the signal 27 reflected by the ground and the horizontal is called the angle of elevation of the image seen by the radar. Specifically, the signal 27 reflected by the ground can be regarded as a signal 28 emitted by the image 29 of the target relative to the ground. The system thus consisting of the target and its image forms a target-image dipole. The signal picked up by the line 23 is therefore composed of the signal 25 re-emitted by the target and of the signal 27 re-emitted by the image.

Figure 3:
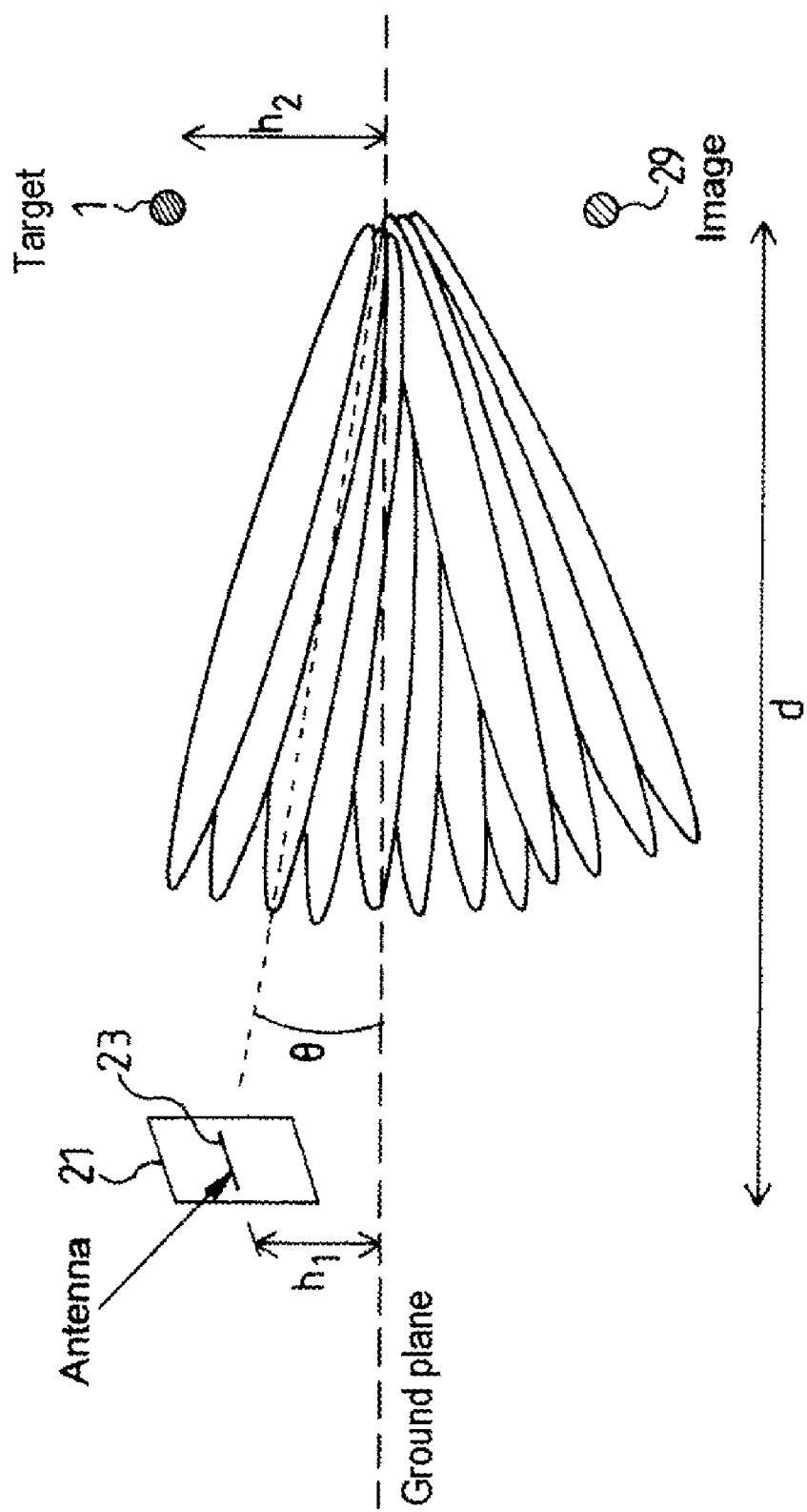

FIG. 3 represents a wide-beam antenna pattern of the surveillance radar type. More particularly, this figure illustrates the modelled antenna pattern corresponding to a dipole composed of the target 1 and of its image 29. This modelling amounts to interpreting the entirety of the signal, of sinusoidal form, originating from the target-image bipole at the level of the antenna as if it were a signal re-emitted by a pointlike system situated at the centre of the dipole.

The physical quantities characterizing the pattern at a given instant are as follows:

d: the distance projected on the ground between the target and the radar,
θ: the angle of sight relative to the horizontal plane of the ground,
$h_1$: the height relative to the ground of the line considered on the antenna,
$h_2$: the height of the target relative to the ground.

The interference pattern resulting from the previously described modelling of the re-emitted signal is of the form, to within a multiplicative constant:

$$|I(\theta)|^2 = 1 + \rho^2 + 2\rho \cos((4\pi h_2 \sin(\theta))/\lambda) + \phi) \quad (1)$$

Where
ρ represents the amplitude of the ground reflection coefficient,
φ is a phase shift between the incident signal and the signal re-emitted,
λ is the wavelength of the signal emitted.

Given that the radar antenna is situated close to the ground, that the target is in the landing phase, and therefore that it too is situated close to the ground, its height relative to the ground is therefore small compared with the distance d and it is therefore possible to consider that the values of the angle θ are small. This therefore makes it possible to simplify equation (1) so as to obtain the following formula for the interference, by likening sin(θ) to θ:

$$|I(\theta)|^2 = 1 + \rho^2 + 2\rho \cos((4\pi h_2 \theta)/\lambda) + \phi) \quad (2)$$

If $h_1$ is the height of a line of the antenna, still for small values of θ, we have the following relation:

$$h_1 = d \times \theta \quad (3)$$

Which gives the following form for equation (2):

$$|I(h_1)|^2 = 1 + \rho^2 + 2\rho \cos((4\pi h_2 h_1)/\lambda d) + \phi) \quad (4)$$

This relation (4) expresses the shape of the interference curve as a function of the height $h_1$.

Figure 4A:
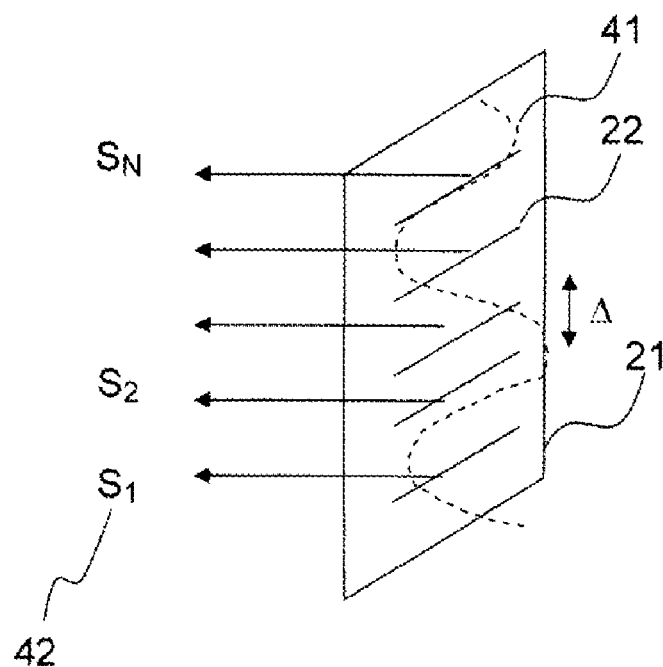

FIG. 4a illustrates the interference signal 41 produced by the direct signal 25 and the reflected signal 27 at the level of the antenna 21 such as expressed by relation (4). The invention utilizes this interference signal 41 present at the level of the antenna. More particularly, the method according to the invention extracts the height $h_2$ from this interference signal. This interference signal is composed of a constant part $1+\rho^2$ and of a sinusoid dependent on the height of the target $h_2$.

The method according to the invention advantageously uses the existence of such an interference signal 41 at the level of the antenna, the amplitude and the period of this signal not being known a priori. To characterize this signal, a sampling 42: $S_1, S_2, S_N$, is performed at the level of the radiating lines 22, 23 of the antenna. The sampling can be performed in a spatially regular manner if the distance Δ between two consecutive radiating lines is constant. It may also be adapted to a non-uniform array of lines. The sampling may therefore depend on the structure of the antenna.

Figure 5:
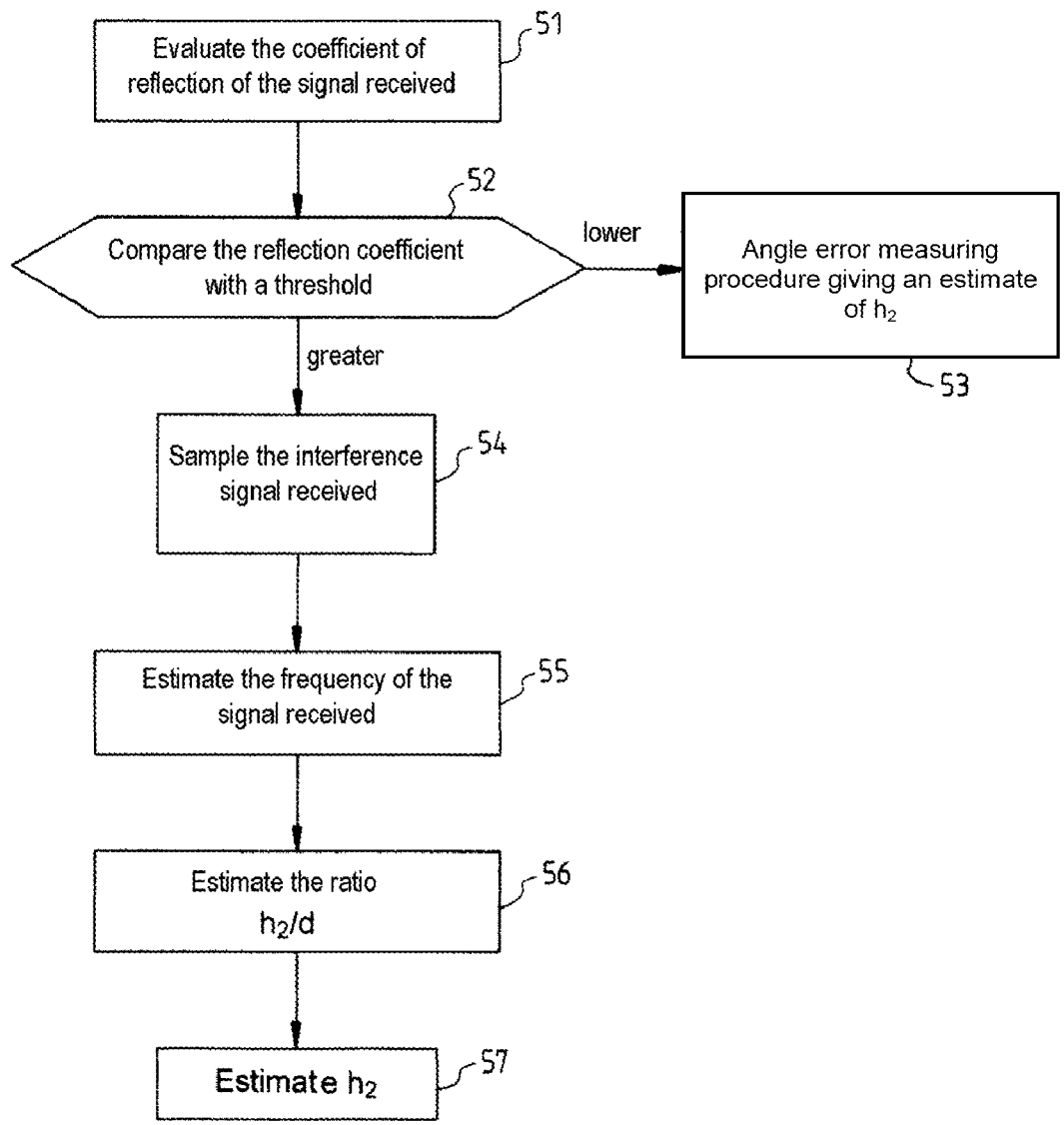

FIG. 5 illustrates the various possible steps for determining the height $h_2$ on the basis of the interference signal 41.

Figure 4B:
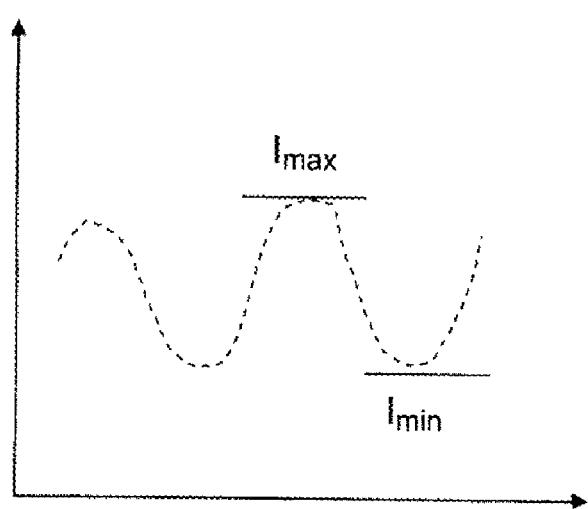

A first step 51 makes it possible to determine the value of the amplitude of the ground reflection coefficient ρ. The minimum and maximum amplitudes, illustrated in FIG. 4b, of the interference signal are given by the following relations: $I_{max}=(1+\rho)^2$ and $I_{min}=(1-\rho)^2$. Consequently, the ratio of the minimum and maximum amplitudes is given by $$\frac{I_{min}}{I_{max}} = \frac{(1-\rho)^2}{(1+\rho)^2},$$

from which the amplitude of the reflection coefficient is deduced:

$$\rho = (1 - \sqrt{I_{min}/I_{max}})/(1 + \sqrt{I_{min}/I_{max}}) \quad (6)$$

Once the value of ρ has thus been calculated, in a second step 52, this value is compared with a given threshold which may be fixed for example at 0.5. If the value of ρ is less than this threshold, it is considered that there is no interference due to the reflection of the signal reflected by the ground. The target is then located in terms of elevation by means of a conventional off-boresight processing 53 of monopulse type for example. In the converse case where a reflection due to the target-image dipole is indeed detected, a processing adapted to the signal resulting from the target and from its image is performed.

This processing begins with a step 54 of spatial sampling of the signal received on each of the antenna lines such as illustrated for example in FIG. 4a. This sampling advantageously requires few values, it can notably be carried out for about ten values. Hereinafter, the number of samples collected will be represented by n.

In a following step 55, the spatial frequency of the interference signal will be estimated on the basis of the sampling of the signal carried out in the previous step. The basic principle of the determination of the frequency is as follows:

Let V be a generic signal of the form:

$$V(x) = \cos(2\pi f x + \phi) \quad (7)$$

With:
φ, representing an unknown,
x, the position of a line on the array of the antenna
f, the frequency of the signal received.

In order to estimate the frequency f of the global signal received, we consider for example a set of n samples represented by the quantity $S = (s_1, \ldots, s_n)$ of the interference signal V(x) sampled on the positions $x_i = x_0 + i\Delta$ with i taking the values from 1 to n, $x_0$ representing the position of an arbitrary line serving as reference on the antenna and Δ being the sampling stepsize corresponding to the distance between two consecutive radiating lines. Thus for any two lines, the following relation is obtained on the basis of equation (7), regardless of i and regardless of k:

$$s_{i+k} + s_{i-k} = \cos(2\pi f x_{i+k} + \phi) + \cos(2\pi f x_{i-k} + \phi) \quad (8)$$

Now, by sampling $x_{i+k} = x_i + k\Delta$ and likewise $x_{i+k} = x_i - k\Delta$.

Relation (8) then becomes, regardless of i and regardless of k:

$$s_{i+k} + s_{i-k} = \cos(2\pi f x_i + \phi + 2\pi f k\Delta) + \cos(2\pi f x_i + \phi - 2\pi f k\Delta) \quad (9)$$

Then with the aid of the following relation $$\cos(X-Y) + \cos(X+Y) = 2\cos(X)\cos(Y) \quad (10)$$

the relation $$s_{i+k} + s_{i-k} = 2\cos(2\pi f x_i + \phi)\cos(2\pi f k\Delta) \quad (11)$$

is obtained on the basis of (9).

Since according to equation (7), $s_i=\cos(2\pi fx_i+\phi)$, the following relation is therefore obtained:

$$s_{i+k}+s_{i-k}=2s_i\cos(2\pi fk\Delta) \quad (12)$$

which leads to the following equation:

$$s_{i+k}+s_{i-k}-2s_i\cos(2\pi fk\Delta)=0 \quad (13)$$

By solving this equation it is possible to obtain an estimation of f. This estimation is obtained by minimizing the function J defined by:

$$J(W) = \sum_{i,k}|s_{i+k} + s_{i-k} - 2s_i\cos(2\pi Wk\Delta)| \quad (14)$$

f is then estimated by the value of $W_0$ which minimizes the functional J. Let:

$$\min_W J(W) = J(W_0) \quad (15)$$

The estimate $\hat{f}$ of f is then given by:

$$\hat{f} = \arg\left(\min_W J(W)\right) = W_0 \quad (16)$$

Within the framework of the problem treated, a model of the re-emitted signal originating from the target-image bipole may be as follows:

$$E(x)=A+\alpha\cos(2\pi fx+\phi)+b(x) \quad (17)$$

where $(\phi,A,\alpha)$ are unknown and $b(x)$ represents Gaussian white noise with variance $\sigma^2$.

In this case, we consider n samples of this signal $$R = \begin{bmatrix} r_1 = E(x_0 + 1\Delta) \\ \vdots \\ r_n = E(x_0 + n\Delta) \end{bmatrix}.$$

The samples of the Gaussian white noise are assumed to be mutually independent and of like variance $\sigma^2$. They will therefore be neglected subsequently.

A first step consists for example in eliminating the constant term A representing the amplitude of the interference signal 41 present at the level of the antenna so as to reduce to a model of the sinusoid plus noise type.

To this end an estimator of the following form can be used:

$$\hat{A} = \frac{1}{2}\left(\min_{i=[1,11]} r_i + \max_{i=[1,11]} r_i\right) \quad (18)$$

The samples R are expressed as a function of the estimator $\hat{A}$ of A. This leads to the samples $$R_{Bis} = \begin{bmatrix} r_1 - \hat{A} \\ \vdots \\ r_n - \hat{A} \end{bmatrix}$$

to which is applied the previously explained basic principle of determining f. In the same manner, f is therefore estimated by minimizing the following functional:

$$J(U) = \sum_{i,k}|r_{i+k} + r_{i-k} - 2r_i\cos(2\pi Uk\Delta)| \quad (19)$$

The sought-after value of f is the value which minimizes the function J(U).

It should be noted that some of the n samples retained should be close to the minimum and to the maximum of the signal so as to obtain a good estimation $\hat{A}$ of A. In the converse case, the estimation $\hat{A}$ might be biased notably if the n measurement points cover less than one period of the signal. This is highlighted in the example which follows.

By way of example, n samples of the signal 17 received on the antenna are used for each result, with for example n=11. The form of the signal presented is as follows:

$$E(x)=A+\alpha\cos(2\pi fx+\phi)+b(x) \quad (17)$$

Figure 6:
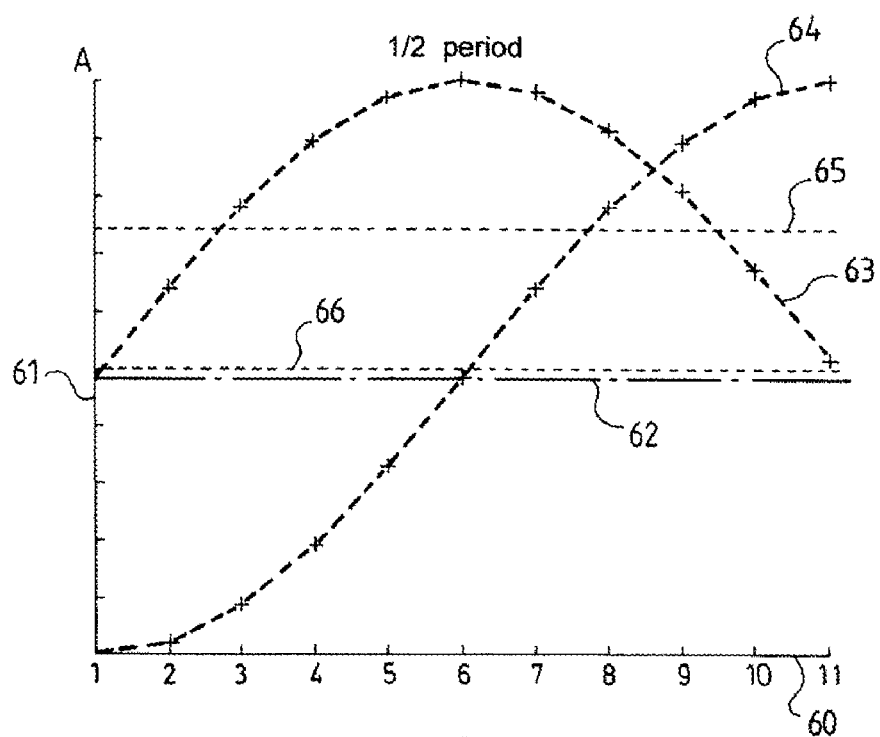
Figure 7:
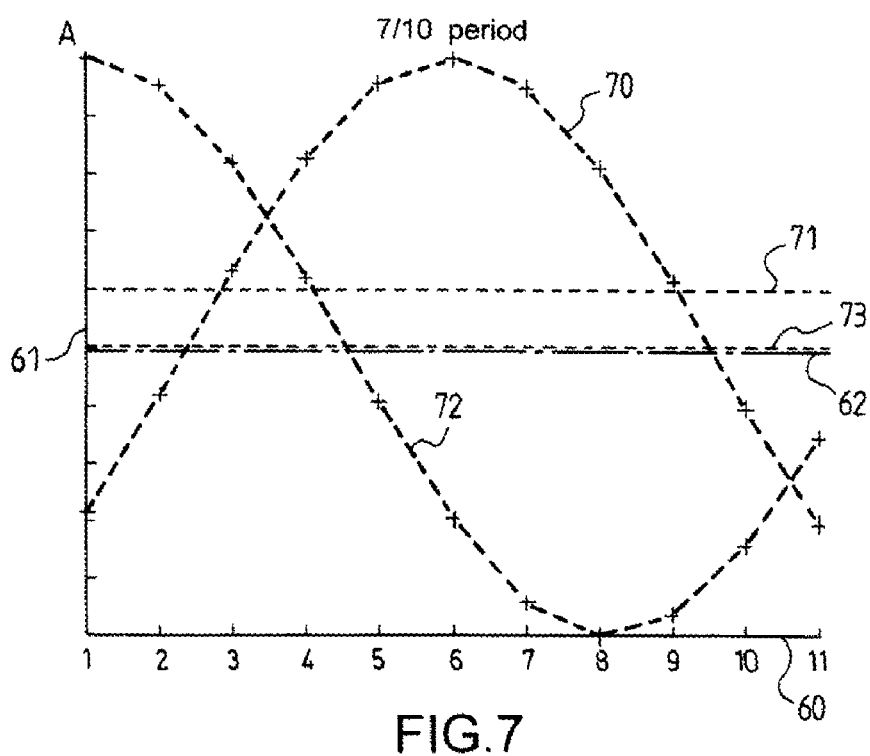

In each of FIGS. 6 and 7, the abscissa 60 represents the n samples, and the ordinate 61 the amplitude A of the interference signal present at the level of the antenna. Each figure presents the results of estimating A for two different samples. The first FIG. 6 uses two samplings 63 and 64 carried out on ½ a reference signal period. The results 65 and 66 obtained respectively for the samples 63 and 64 give estimations of A which differ by nearly 10%.

The second FIG. 7 uses over $7/10^{th}$ of a period two samplings 70 and 72 giving respectively the results 71 and 73 for the estimated value of A. The difference between the two results is here of the order of 4%.

This shows clearly that the results of the estimation of A may be strongly biased if the samples cover only a small part of the period of the signal. This therefore also gives rise to a significant error in the estimation of f. It is therefore necessary for the samples used to be chosen correctly, this not always being possible.

This is why, in a preferential manner, the constant term A can be eliminated by direct subtraction of the signal received on one line from the signal received on the next line. A new sampling R' of the following form is thus obtained:

$$R' = \begin{bmatrix} r'_1 = r_1 - r_2 \\ r'_2 = r_2 - r_3 \\ \vdots \\ r'_{n-1} = r_{n-1} - r_n \end{bmatrix}.$$

The processing operations for estimating f are thereafter the same as those described previously.

Once the estimation has been obtained for f, the next step 56 makes it possible to obtain the ratio $h_2/d$, the height of the target over the distance between the radar and the target projected on the ground, in the following manner:

By considering as phase and amplitude reference at a given instant the direct path for the first line, the latter receives a signal of value $S_1$:

$$S_1=1+\rho\times e^{j\phi}\times e^{-j(2\pi/\lambda)2(h_1h_2/d)} \quad (20)$$

With:
$\rho$: the modulus of the ground reflection coefficient
$\phi$: the phase of the ground reflection coefficient
$\lambda$: the wavelength of the signal emitted by the target The assumptions are as follows:

ρ and φ are constant for the n re-emitted signals, $\theta_c$ is identical for the n direct signals (it is assumed that the signals are parallel)

By putting $\Delta$ for the distance between the first and the second line, the signal received by the second line of the array is expressed in the following manner:

$$S_2 = e^{j(2\pi/\lambda)\Delta \times \sin(\theta c)}(1+\rho \times e^{j\phi} \times e^{-j(2\pi/\lambda)2(h_2(h_1+\Delta)/d)}) \quad (21)$$

Which gives for the $(k-1)^{th}$ line:

$$S_{1+k} = e^{j(2\pi/\lambda)k \times \Delta \times \sin(\theta c)}(1+\rho \times e^{j\phi} \times e^{-j(2\pi/\lambda)2(h_2(h_1 k \times \Delta)/d)}) \quad (22)$$

And therefore for the $k^{th}$ line:

$$S_k = e^{j(2\pi/\lambda)(k-1) \times \Delta \times \sin(\theta c)}(1+\rho \times e^{j\phi} \times e^{-j(2\pi/\lambda)2(h_2(h_1+(k-1)\times\Delta)/d)}) \quad (23)$$

The modulus of the signal received for each line is therefore given by the following relation:

$$|S_k|^2 = S_k \times S^*_k = 1+\rho^2+2\rho \cos((2\pi/\lambda)2(h_2(h_1+(k-1)\times \Delta)/d)+\phi) \quad (24)$$

By putting $\phi' = (2\pi/\lambda)2(h_2(h_1-a)/d)+\phi$, the following relation is obtained:

$$|S_k|^2 = 1+\rho^2+2\rho \cos((2\pi/\lambda)2(h_2 \times k \times \Delta)/d)+\phi') \quad (25)$$

This relation reveals an amplitude modulation on the height of the antenna whose frequency f depends directly on the height of the target relative to the ground:

$$f = 2h_2/\lambda d \quad (26)$$

thereby giving the ratio of the height of the target to the distance projected on the ground between the radar and the target as follows:

$$h_2/d = \lambda f/2 \quad (27)$$

The ratio $h_2/d$ is therefore defined for a given value of the wavelength $\lambda$.

The objective of the last step 57 is notably to give an estimation of the height of the target as well as angles of elevation.

By considering that the target deploys at very low altitude, the angles of elevation have notably a small value. Thus, an estimation d' of d can be obtained, for example by a radar measurement. This estimation d', on account of the small value of the angles, can be regarded as the radial distance r between the phase centre of the radar antenna and the target. This distance r being measured by the radar. The error incurred by making this estimation tends moreover to decrease as the target approaches the ground.

The angles of elevation described in FIG. 2 are determined by the following equations obtained by construction:

for the angle of elevation $\theta_c$ of the target seen by the radar:

$$\theta_c = \text{artctg}\left(\frac{h_2}{d} - \frac{h_1}{d'}\right) \quad (28)$$

for the angle of elevation $\theta_i$ of the image seen by the radar:

$$\theta_i = -\text{artctg}\left(\frac{h_2}{d} + \frac{h_1}{d'}\right) \quad (29)$$

The ratio $h_2/d$ having been calculated in the previous step, the angles $\theta_c$ and $\theta_i$ are easily calculated.

Additionally, once $\theta_c$ has been determined, $h_2$ is deduced therefrom in the following manner:

$$h_2 = r \sin(\theta_c) + h_1 \quad (30)$$

r being the radial distance measured by the radar antenna.

Equations (28), (29), (30) therefore make it possible to obtain the estimated values of $\theta_c$, $\theta_i$, and $h_2$.

Figure 8B:
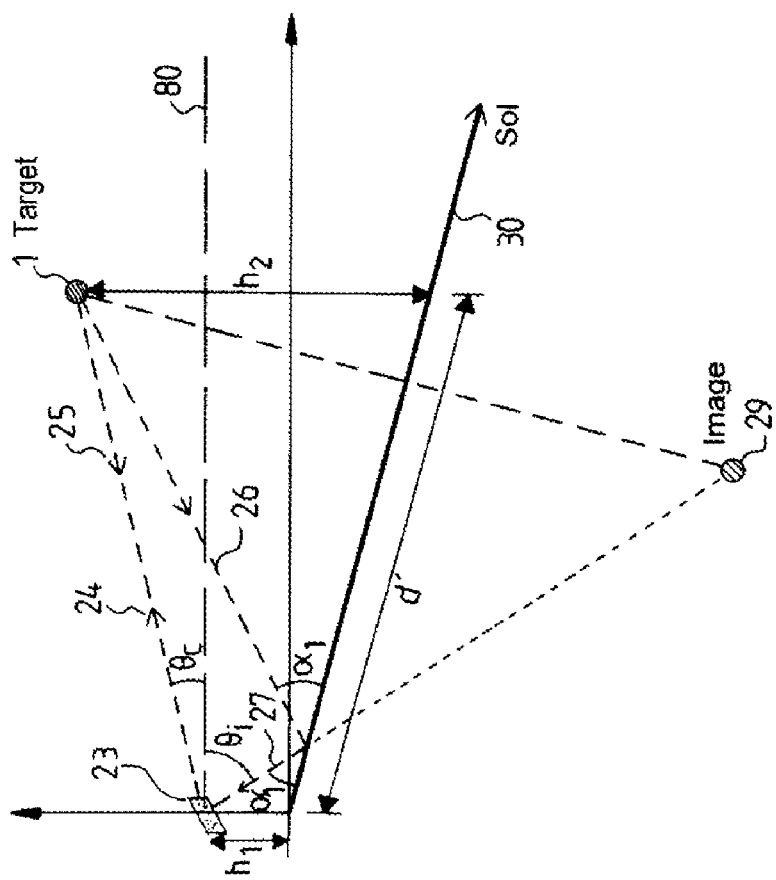
Figure 8A:
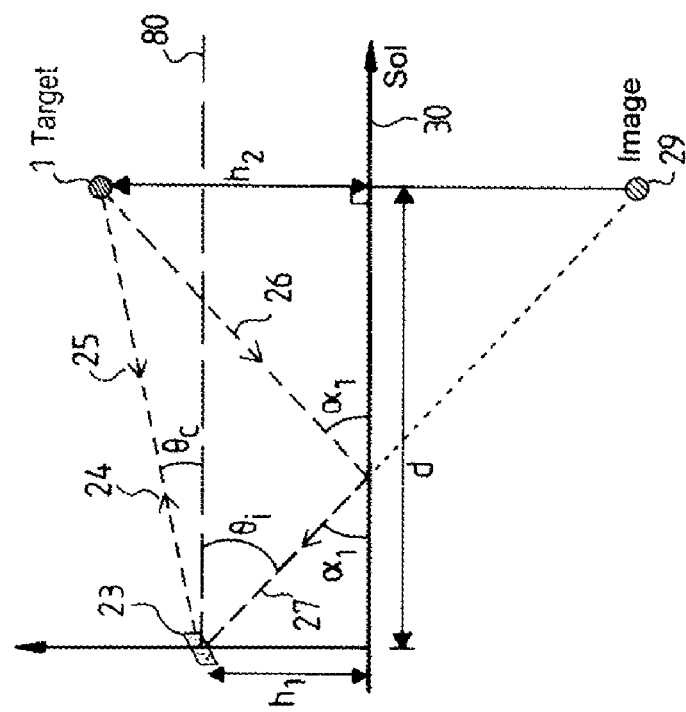

FIGS. 8a and 8b highlight the difference between the results obtained in the case where the ground is horizontal and in the case where it is not. FIG. 8a represents the case of a horizontal ground and notably the quantities characteristic of the elevation: $\theta_c$, $\theta_i$, and $h_2$. The principle of constructing the quasi-specular reflection of the ray re-emitted by the target 26 is that the angles of incidence of the signal 26 and of reflection of the signal 27 relative to the plane of reflection are assumed to be equal to an angle $\alpha_1$. The height $h_2$, which comes into the previous equations, corresponds in reality to the height of the target relative to the plane of reflection, which here coincides with the ground, and not to the height of the target relative to the ground vertically. If FIG. 8b is considered, when the ground is not horizontal, the image of the target does not have the same position as in FIG. 8a. Specifically, the image is the symmetric projection of the target relative to the plane of reflection which, in the case of FIG. 8b, is not horizontal. The height $h_2$ of the target relative to the plane of reflection will therefore be different in the case of non-horizontal ground. The estimation of the elevation may thus be biased and it may be necessary to refine the result.

Figure 9:
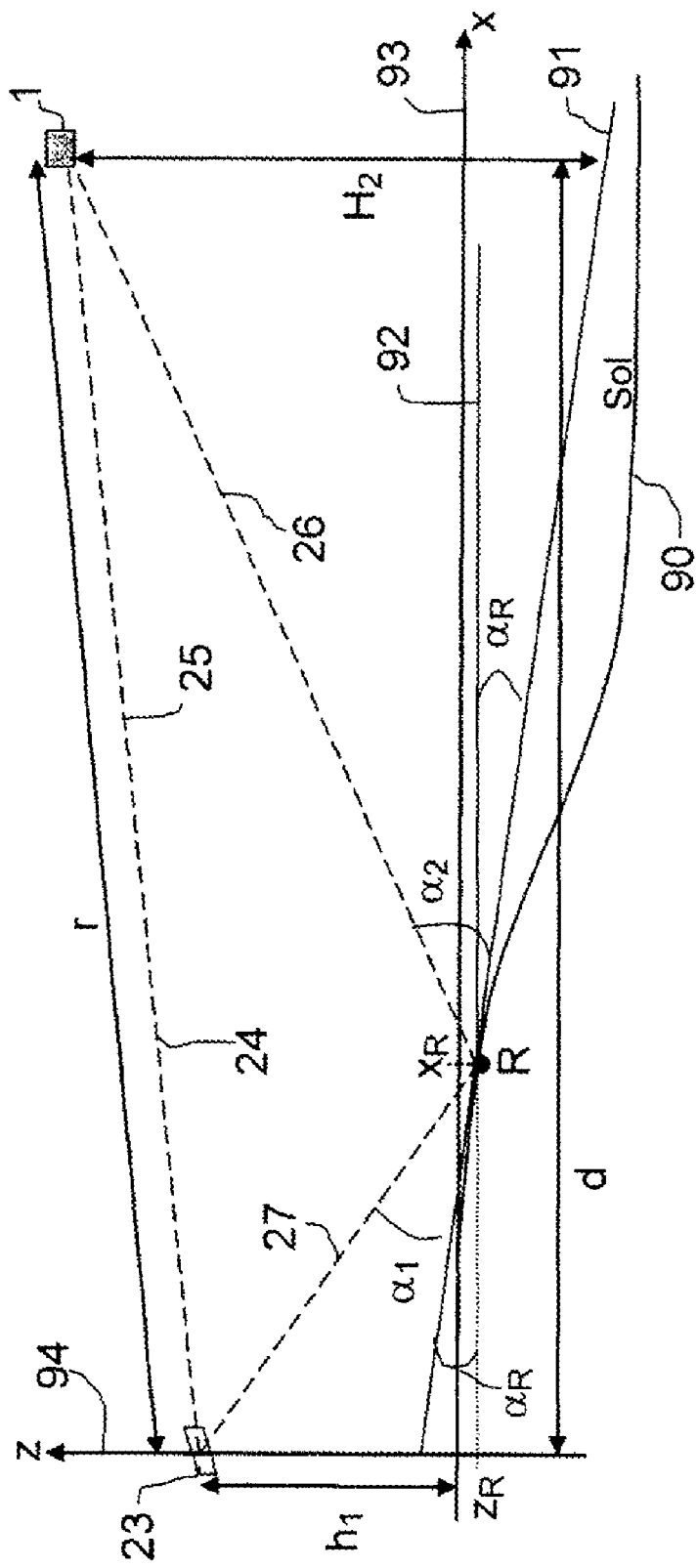

FIG. 9 represents the reflection phenomenon in the presence of non-plane and non-horizontal ground 90, the profile of the ground between the radar and the target being known. The following elements of FIGS. 1 and 2 are represented in the figure:

the target 1 represented in a pointlike manner, the line 23 of the antenna situated at a height ha from the ground, the radial distance r between the radar and the target, the horizontal distance d between the radar and the target, the signal 24 emitted by the line 23 and re-emitted as a signal 25 in a direct manner by the target 1, the signal 26 re-emitted towards the ground by the target and its reflection 27 on the ground.

The height $H_2$ represents the height of the target relative to the tangent plane 91 to the ground at a point R called the reflection point. Determining the reflection point entails calculating its position in the reference frame of the radar. The position of R is characterized by its coordinates $x_R$ and $z_R$ respectively in relation to the horizontal axis 93 and the vertical axis 94 as well as by the angle $\alpha_R$ formed between the slope 91 of the ground at this point and the horizontal 92.

The profile of the ground is assumed known, thereby affording access to the knowledge of $z_R$ and $\alpha_R$ for all the potential positions of the point R, that is to say $z_R = f(x_R)$, the function f being known, and $\alpha_R = g(x_R)$, the function g also being known. The principle used to calculate the coordinates of the point R is based on the fact that the angles of reflection and of incidence of the signal re-emitted by the target towards the ground are equal at this point. They are represented respectively in the figure by the angles $\alpha_1$ and $\alpha_2$. By considering the angles to be small, the following assumption is made: $\tan(\alpha) = \sin(\alpha) = \alpha$, $\alpha$ being any one of the angles represented in the figure. By construction and by making the assumption stated above the following relations are obtained for $\alpha_1$ and $\alpha_2$:

$$\alpha_1 = \frac{h_1 - z_R + x_R \times \alpha_R}{x_R} \quad (31)$$

-continued $$\alpha_2 = \frac{h_2}{d - x_R} \quad (32)$$

As $\alpha_1 = \alpha_2$, the following relation is then obtained:

$$\frac{h_1 - z_R + x_R \times \alpha_R}{x_R} = \frac{h_2}{d - x_R} \quad (33)$$

with $h_1$ the height of the antenna relative to the ground and $h_2$, the elevation height calculated in the case of plane and horizontal ground.

The coordinates of the point R are obtained by minimizing the following cost function:

$$|C(R)| = \left| \frac{h_1 - z_R + x_R \times \alpha_R}{x_R} - \frac{h_2}{r - x_R} \right| \quad (34)$$

The coordinates thus obtained of the point R make it possible to define the tangent plane to the ground at the reflection point, or plane of reflection, which is subsequently regarded as the ground itself so as to reduce the case of non-plane and non-horizontal ground to the case of non-horizontal ground which is simpler to treat.

Once the coordinates of the point R have been calculated and notably the angle $\alpha_R$, a correction is applied to the elevation height obtained for plane and horizontal ground. The height $h_2$ relative to the horizontal ground then becomes the height $H_2$ relative to the plane of reflection. This height $H_2$ is given by the following relation:

$$H_2 = h_2 + z_R + (d - x_R) \times \alpha_R \quad (36)$$

where d represents the distance between the target and the radar, projected onto the horizontal 92. The corrected value for the height of the target relative to the plane of reflection for non-plane and non-horizontal ground is thus obtained.

The estimation thus obtained for the elevation can advantageously be improved by an amplitude phase correlation calculation of the signal received with a predefined replica also named CHA or Correlation Height Algorithm.

One of the advantages of the method according to the invention is to improve elevational location while preserving a constant antenna dimension, and a possibility of surveillance in an extended angular domain. The stability of the results obtained in the domain of coverage without lobe widening and without fading is also appreciable.

Moreover, the simplicity of the processing implemented allows its application at lower cost. It also requires a reasonable calculation capability given that it is possible to limit the number of reception channels. Specifically a small number of measurements suffices to obtain a good estimation of the elevation.

Another advantage of the invention is that the method can be used equally well on a complete array antenna and on a sparse antenna. Moreover it can be applied equally well for an antenna comprising uniform or non-uniform arrays.

In the exemplary implementation of the invention, the antenna for receiving the signals re-emitted by the target corresponds to the antenna of the radar emitting the detection signal. This antenna could be different from the emission antenna.

The invention claimed is:

1. Method for determining by an electromagnetic detection system an elevation of a target close to a ground, comprising the steps of:
   receiving, by a reception antenna, a first signal emitted directly by a target;
   receiving, by the reception antenna, a second signal emitted by the target towards the ground then reflected by the ground toward the electromagnetic detection system, wherein the reception antenna comprises a plurality of sub-arrays of radiating elements;
   sampling an interference signal produced by the first signal and by the second signal at the level of the sub-arrays, to produce a sampled interference signal; and
   determining the elevation of the target from an amplitude of the sampled interference signal,
   wherein a frequency f of the sampled signal is a value which minimizes a function:

$$J(U) = \sum_{i,k} |r_{i+k} + r_{i-k} - 2r_i \cos(2\pi U k \Delta)|$$

wherein
   $r_{i+k}$ is a subtraction between a value of a signal received at sub-array i+k and the value of the signal received at sub-array i+k+1,
   $r_{i-k}$ is a subtraction between the value of the signal received at sub-array i−k and the value of the signal received at sub-array i−k−1, and
   $\Delta$ is a distance between the phase centers of two consecutive sub-arrays.

2. The method of claim 1, further comprising the steps of:
   emitting a detection signal towards the target, wherein the signal re-emitted directly by the target is the first signal, and the signal re-emitted by the target towards the ground then reflected by the ground is the second signal.

3. The method of claim 1, wherein the sub-arrays comprise a line of radiating elements disposed in a substantially horizontal, parallel and uniform manner over the reception antenna as a whole.

4. The method of claim 1, wherein the sub-arrays are situated in a substantially vertical plane.

5. The method of claim 1, further comprising the following step:
   calculating a ratio between an height $h_2$ of the target relative to the ground and a distance d projected on the ground between the electromagnetic detection system and the target according to the relationship: $h_2/d = \lambda f/2$ where $\lambda$ is a wavelength of the first signal and f is a frequency of the interference signal.

6. The method of claim 5, further comprising the following step:
   obtaining the coordinates $(x_R, z_R)$ of a reflection point R and an angle $\alpha_R$ between the tangent plane to the ground at the point R and the horizontal on the basis of a cost function:

$$|C(r)| = \left| \frac{h_2 - z_R + x_R \times \alpha_R}{x_R} - \frac{h_2}{d - x_R} \right|$$

wherein:
   $h_1$ represents the height relative to the ground of the antenna, $h_2$ represents an estimation of the height calculated in the case of plane and horizontal ground, d represents the distance projected on the ground of the target from the antenna, and the values $(x_R, z_R, \alpha_R)$ minimizing the cost function are the coordinates of the reflection point R.

7. The method of claim 6, further comprising the following steps:

correcting the height of the target relative to the tangent plane to a value $H_2$, using the value of the angle $\alpha_R$ between the tangent plane at R to the terrain and the horizontal, as:

$$H_2 = h_2 + z_R(d-x_R) \times \alpha_R.$$

8. The method of claim 5, further comprising the following step:

determining the height $h_2$ for a non-plane and non-horizontal ground on the basis of a point of reflection R of a signal re-emitted by the target towards the ground on non-horizontal ground, or of a height determined for plane and horizontal ground.

9. The method of claim 1, further comprising the following step:

correlating an amplitude and a phase of the signal received with a predefined replica.

10. The method of claim 1, wherein the antenna used includes a sparse antenna.

11. The method of claim 1, wherein the target comprises an active emitter.

12. The method of claim 1, wherein the target includes a passive reflector.

13. The method of claim 1, wherein the target includes a drone in the landing phase.

14. The method of claim 1, further comprising the step of determining a height $h_2$ of the target by a monopulse-type process if the value of the amplitude of the reflection coefficient is less than a predetermined threshold.

* * * * *